United States Patent
Dawson, Jr. et al.

(10) Patent No.: US 7,086,090 B1
(45) Date of Patent: Aug. 1, 2006

(54) METHOD AND SYSTEM FOR PROTECTING PERVASIVE DEVICES AND SERVERS FROM EXCHANGING VIRUSES

(75) Inventors: Frank Robertson Dawson, Jr., Raleigh, NC (US); Yen-Min Huang, Raleigh, NC (US); Brent A. Miller, Cary, NC (US); Sandeep K. Singhal, Englewood Cliffs, NJ (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 09/692,988

(22) Filed: Oct. 20, 2000

(51) Int. Cl.
*G06F 11/30* (2006.01)
*G06F 15/16* (2006.01)

(52) U.S. Cl. ........................................ 726/24

(58) Field of Classification Search .............. 713/201, 713/188, 200; 714/38; 709/223, 224; 717/168–178
See application file for complete search history.

(56) References Cited

U.S. PATENT DOCUMENTS

| | | | |
|---|---|---|---|
| 5,086,502 A | 2/1992 | Malcolm | |
| 5,649,095 A | 7/1997 | Cozza | 395/183.15 |
| 5,832,208 A | 11/1998 | Chen et al. | 395/187.01 |
| 5,854,916 A | 12/1998 | Nachenberg | 395/500 |
| 5,892,904 A * | 4/1999 | Atkinson et al. | 713/201 |
| 5,918,008 A * | 6/1999 | Togawa et al. | 726/24 |
| 5,919,257 A | 7/1999 | Trostle | 713/200 |
| 5,948,104 A * | 9/1999 | Gluck et al. | 713/200 |
| 5,960,170 A | 9/1999 | Chen et al. | 395/183.14 |
| 5,974,549 A * | 10/1999 | Golan | 713/200 |
| 5,987,610 A | 11/1999 | Franczek et al. | 713/200 |
| 6,067,618 A * | 5/2000 | Weber | 713/1 |
| 6,092,194 A * | 7/2000 | Touboul | 713/200 |
| 6,151,643 A * | 11/2000 | Cheng et al. | 710/36 |
| 6,154,844 A * | 11/2000 | Touboul et al. | 713/201 |
| 6,202,207 B1 * | 3/2001 | Donohue | 717/173 |
| 6,275,938 B1 * | 8/2001 | Bond et al. | 713/200 |
| 6,327,584 B1 * | 12/2001 | Xian et al. | 707/1 |
| 2002/0013910 A1 * | 1/2002 | Edery et al. | 713/201 |

FOREIGN PATENT DOCUMENTS

| | | |
|---|---|---|
| EP | 0800135 | 10/1995 |
| WO | 9533237 | 12/1995 |

OTHER PUBLICATIONS

Meikle, Patrick. Hot!NEWstuff: McAfee: Antivirus software for handhelds to Meikle. Aug. 21, 2000.*
Silver, Karen. PC WORLD:Do Handhelds Need Virus Protection. Jun. 29, 2000.*

(Continued)

*Primary Examiner*—Christopher Revak
(74) *Attorney, Agent, or Firm*—Duke W. Yee; A. Bruce Clay; Wayne P. Bailey

(57) ABSTRACT

A method and apparatus for preventing exchange of viruses. Preexisting content is maintained for a device in a first location. New content associated with the device is placed in a second location, wherein the new content is an update to the preexisting content. The preexisting content and the new content are combined in a third location to form merged content. A check for viruses is performed on the merged content prior to performing a transfer of the new content.

22 Claims, 6 Drawing Sheets

OTHER PUBLICATIONS

Gray Jim et al: "Trnsaction Processing: Concepts and Techniques", Transactions Processing: Concepts and Techniques, pp. 724-732 XP002194027.

CNET: "Palm's Trojan Horse Spurs Antivirus Software Makers", Internet Article, http://news.com.com/2100-1040-245449. Retrieved on Apr. 15, 2003, p. 1, paragraphs 1-5.

* cited by examiner

METHOD AND SYSTEM FOR PROTECTING PERVASIVE DEVICES AND SERVERS FROM EXCHANGING VIRUSES

FIELD OF THE INVENTION

The present invention relates generally to an improved data processing system and in particular to a method and apparatus for preventing unauthorized changes to software. Still more particularly, the present invention provides a method and apparatus for protecting a data processing system from a virus.

BACKGROUND OF THE INVENTION

The computer field in general has been plagued by the introduction of programs known as computer "viruses", "worms", or "Trojan horses". These programs are often introduced for malicious reasons, and often result in significant damage to both stored data and other software. Many software solutions have been devised to help counter this growing threat to computer file integrity. Among these solutions is a general virus scanner program that scans a file or set of files, for particular known viruses. This method of virus detection is particularly effective against known viruses.

Computer viruses have the particular property of being able to replicate themselves and thus spread from one computer file to another, one computer volume to another, and eventually, from one machine to another. The virus may not be designed to do anything intentionally malicious, but to qualify as a virus, it must have the capability of replicating itself. This distinguishes computer viruses from programs such as "Trojan horses".

Viruses may spread in a number of ways. For example, a virus may spread by adding itself to code that already exists within some program on a computer, then changing that preexisting code in such a way that the newly added viral code will be executed. This will then enable the virus to execute again and replicate itself in yet another program.

With new classes of pervasive devices being connected to the Internet along with the use of enterprise servers, it is likely that viruses may be designed to infect these pervasive devices as well. These pervasive devices include personal digital assistants (PDAs), such as the Palm Pilot (available from Palm Computing, Inc.); analog and digital cellular phones; network-connected home appliances, such as certain refrigerators; automotive computers; screen phones that mix data communications with voice communications; and Web-enabled televisions that support interactive television programming, Web access, and personal communications. With the number of pervasive devices expected to surpass the current number of PC and laptop computers, the infection of pervasive devices with a virus would result in more devastating damage and be more difficult to disinfect. Protecting pervasive devices from exchanging viruses imposes new challenges due to the different connection styles of these pervasive devices. For example, many pervasive devices are only intermittently connected to the computer network. Moreover, these computers operate by exchanging data updates with a server, a process called synchronization, to ensure that the data store on the device and the data store on the server (a synchronization server) are kept consistent. The task of protecting pervasive devices is made more complex because these devices typically have limited processor and memory resources. Consequently, these devices cannot run sophisticated virus scanning and correction programs, which invariably require considerable processor and memory resources on the machine being scanned.

Therefore, it would be advantageous to have an improved method and apparatus for protecting pervasive devices and servers from exchanging viruses.

SUMMARY OF THE INVENTION

The present invention provides a method in a data processing system for preventing exchange of viruses. Preexisting content is maintained for a device in a first location. New content for the device is placed in a second location, wherein the new information is an update to the preexisting data. The preexisting content and the new data are combined in a third location to form merged content. A check for viruses is performed on the merged data prior to performing a transfer of the new content.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
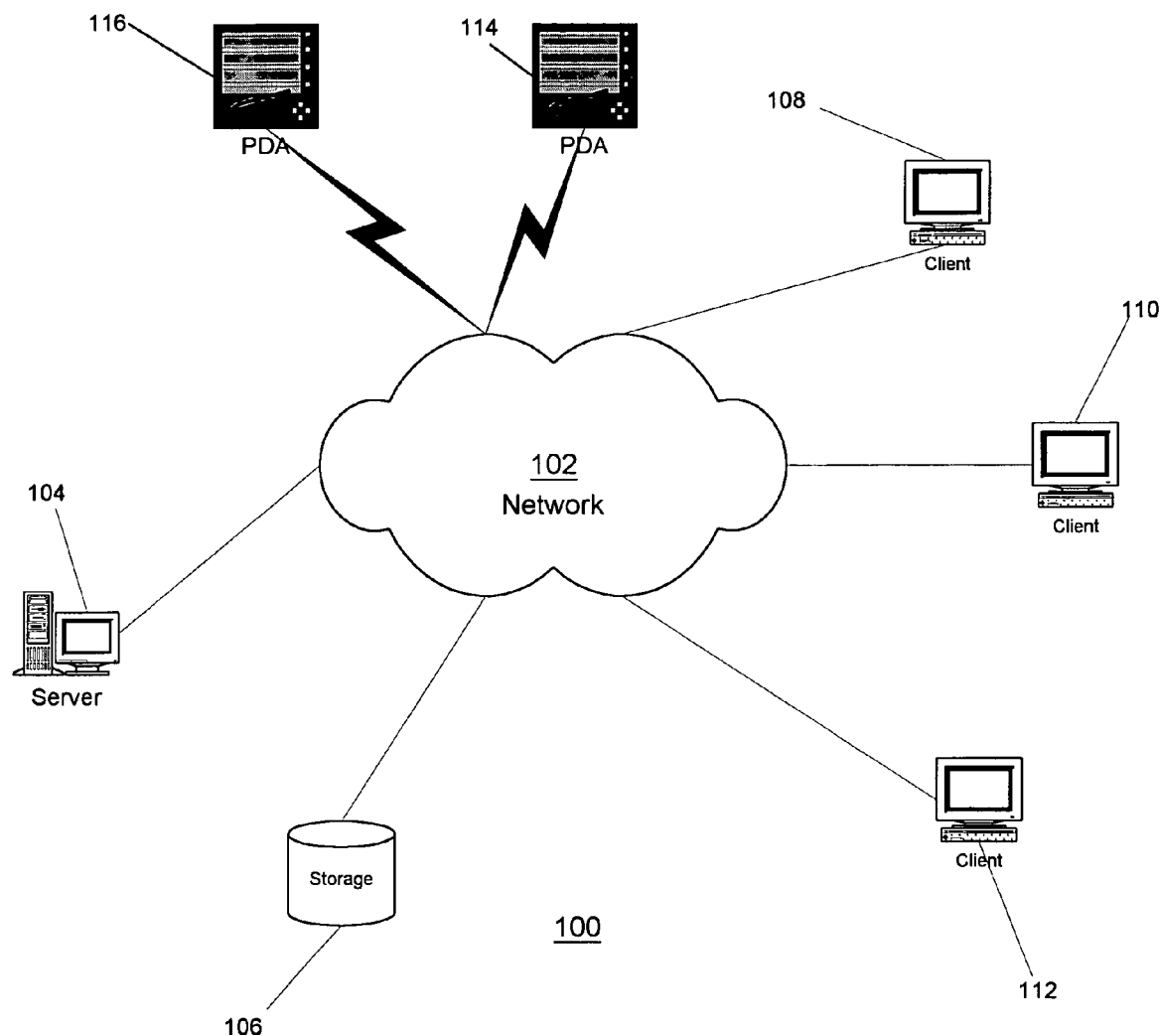
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. Clients 114 and 116 in these examples are pervasive devices, which communicate using wireless communication links. Clients 114 and 116 may be, for example, PDAs or some other hand-held computing device. Although these clients communicate with network 102 using wireless links, a physical connection, such as a phone line or ethernet connection may be used.

In the depicted example, server 104 provides data, such as boot files, operating system images, and applications to clients 108–116. Clients 108–116 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). These networks also include mechanisms for wireless communications links in these examples. FIG. 1 is intended as an example, and not as an architectural limitation for the present invention.

Figure 2:
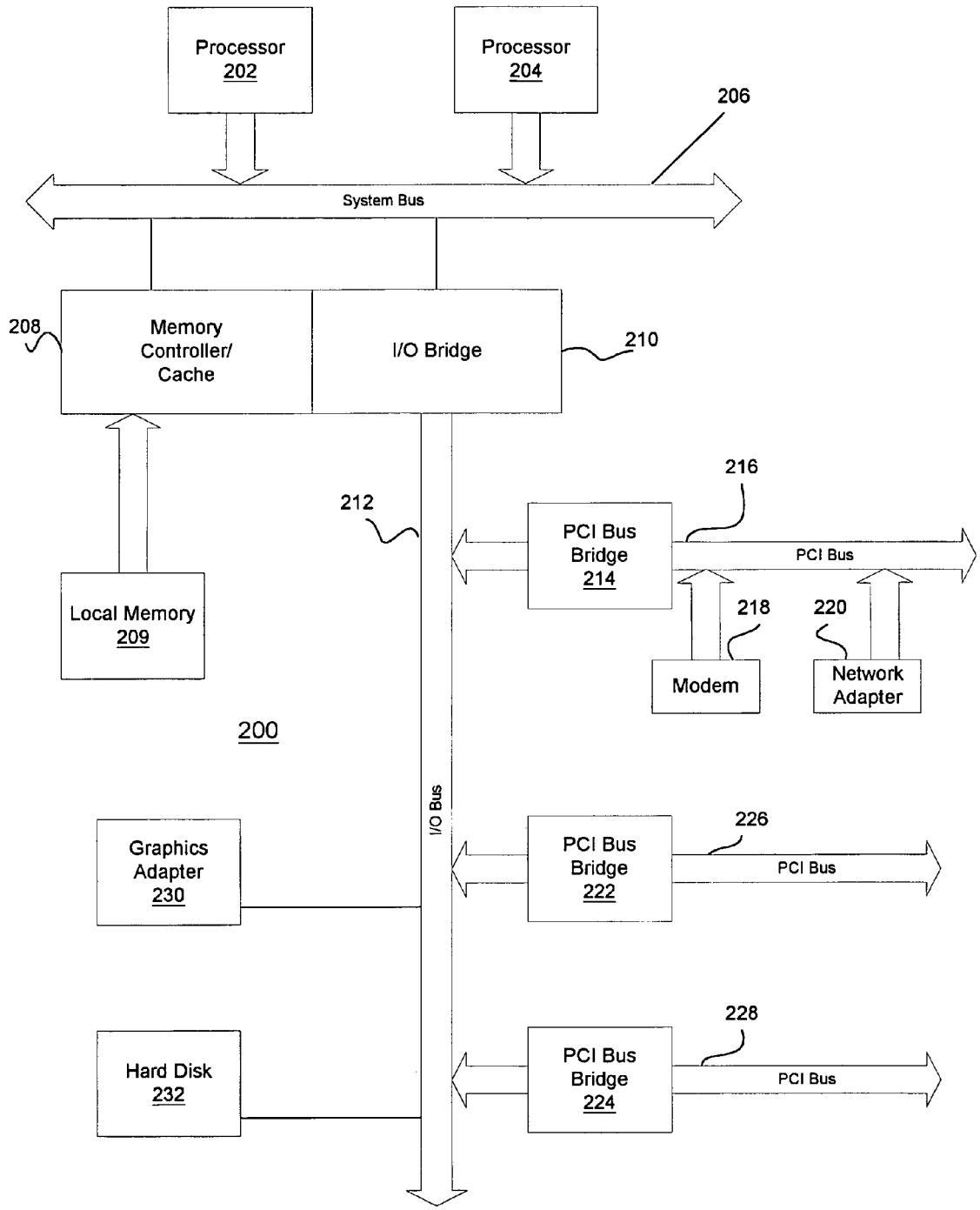
FIG. 2 is a block diagram of a data processing system that may be implemented as a server, such as server 104 in FIG. 1, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. The processes of the present invention are implemented in a server, such as data processing system 200 in these examples. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
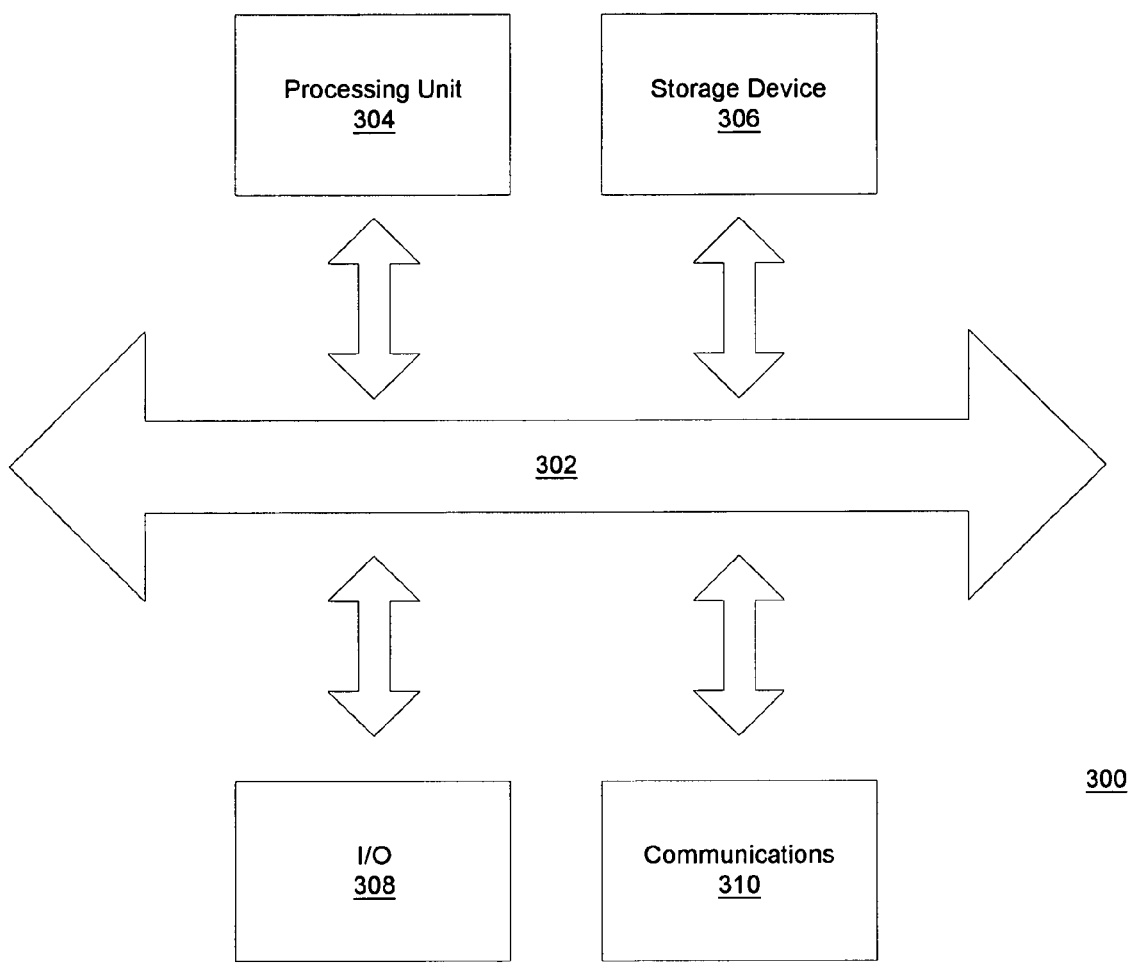
FIG. 3 is a block diagram of a client in accordance with a preferred embodiment of the present invention.

Turning next to FIG. 3, a block diagram of a client is depicted in accordance with a preferred embodiment of the present invention. In this example, data processing system 300 is an example of a client, such as client 108 or client 116 in FIG. 1. data processing system 300 includes a bus 302, which interconnects and provides communication between processing unit 304, storage device 306, input/output (I/O) unit 308, and communications unit 310. Processing unit 304 may include one or more processors and executes instructions located in storage device 306. Storage device 306 contains instructions for performing various functions as well as data and may take various forms depending on the type of client. For example, storage device 306 may be a random access memory (RAM), a read-only memory (ROM), a non-volatile RAM (NVRAM), or a hard disk drive. I/O unit 308 provides interactive with data processing system 300 and typically includes a display device as well as an input device, such as a keyboard, touchpad, mouse, or touch screen. Communications unit 310 provides for exchanging data with other systems. Communications unit 310 may take various forms, such as, for example, a wireless modem or a network adapter.

The present invention provides a method, apparatus, and computer implemented instructions for protecting clients and servers from exchanging viruses. The present invention recognizes that many clients, such as pervasive devices, communicate with servers via synchronization. This type of communication results in incremental updates to data or software being stored on a server for a client. With this situation, it is possible for a virus to contain two or more parts in which the individual parts are harmless. When all of the parts are put together, however, the aggregate results in a virus. With incremental updates, latent viruses, such as these, may be propagated to servers and other clients.

The mechanism of the present invention eliminates these types of threats of introducing and spreading viruses. This mechanism is especially useful for clients that use a server as a primary means of communication. Updates or additions to data or software for a client are not sent to a client or stored on a server with existing data for the client until the union of this data is tested for the presence of a virus.

Figure 4:
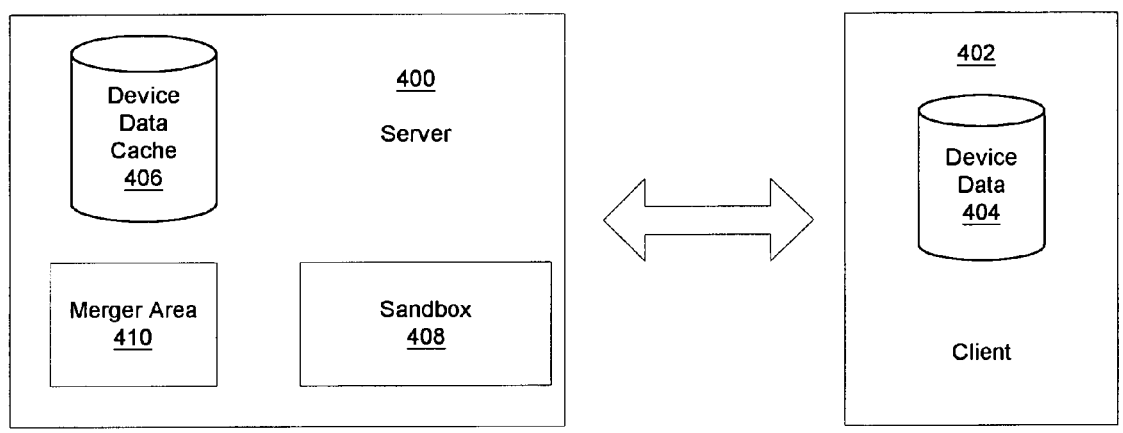
FIG. 4 is a block diagram illustrating components used in preventing the spread of a virus between a client and a server in accordance with a preferred embodiment of the present invention.

Turning next to FIG. 4, a block diagram illustrating components used in preventing the spread of a virus between a client and a server is depicted in accordance with a preferred embodiment of the present invention. In this example, server 400 provides communication and data to client 402. Client 402 contains device data 404, which may change due to updates made by a user of client 402 or through updates received from server 400. Server 400 contains device data cache 406, which contains data that may be updated periodically through changes received from client 402 or from other sources. This device data cache 406 may include software or programs in addition to data. The software and/or data is also referred to as "content" for the client.

Server 400 also includes sandbox 408 and merger area 410. These two components are located in one or more storage devices within server 400 in these examples. For example, memory, such as RAM, may be used or a storage device, such as a hard disk drive may be used to implement these components. Sandbox 408 is a holding area for updates being sent to client 402 or received from client 402. Before the updates are transferred to client 402 or placed in device data cache 406 from sandbox 408, a union or merger of the content is made and placed into merger area 410. The content being merged is content in device data cache 406 and the updates located in sandbox 408. The merged content is scanned or analyzed to determine whether a virus is present in the combined or merged content. Merger area 410 is designed or configured to be merely a holding area and not an area in which any of the content can be executed or used for purposes other than determining whether a virus is present.

If a virus is absent, then the merged content is stored in device data cache 406 or the updates are sent to client 402, depending on the data flow. On the other hand, if a virus is found, the virus may be removed prior to storing the update on server 400 in device data cache 406 or prior to sending the update to client 402. In this manner, infected data may be detected and disinfected or removed prior to that content reaching its destination. In addition, any virus received directly from a client may be disinfected at the time of synchronization, preventing further spreading of the virus.

Figure 5:
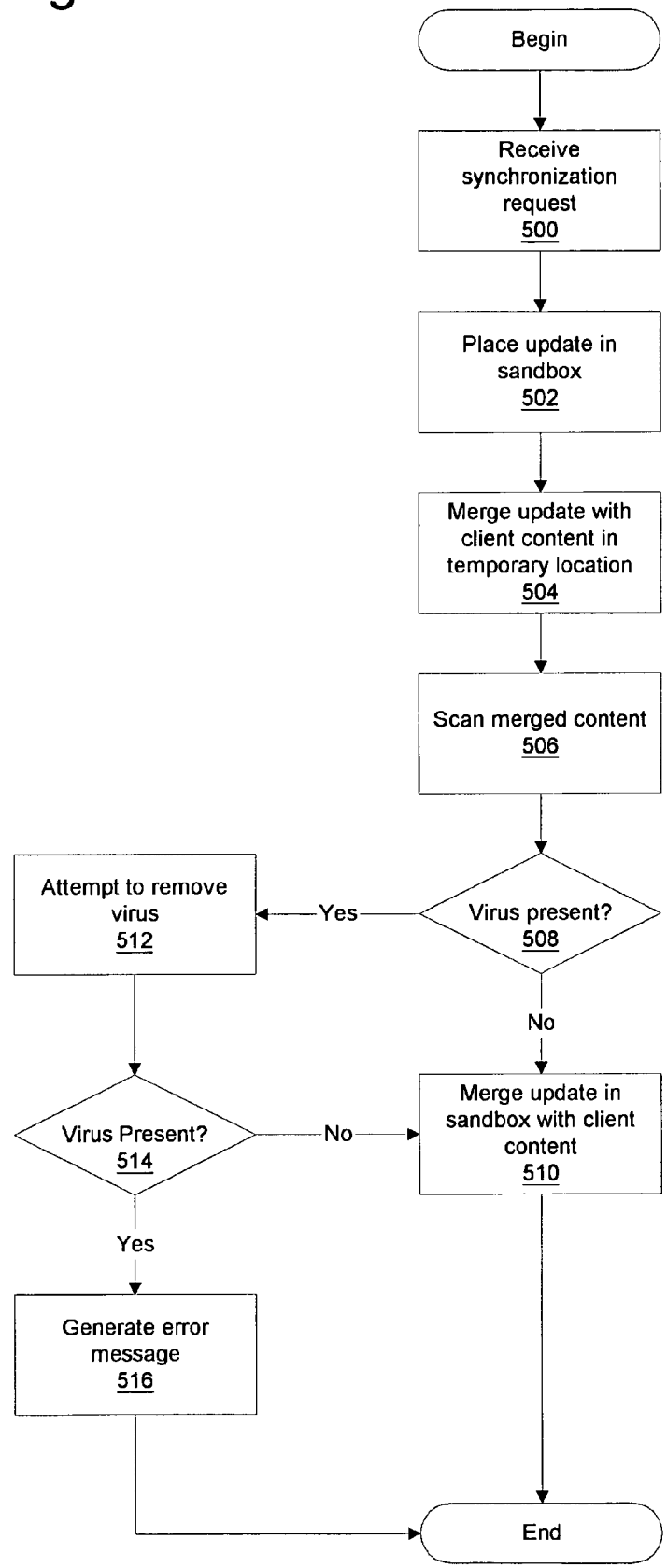
FIG. 5 is a flowchart of a process used for receiving updates from a client in accordance with a preferred embodiment of the present invention.

Turning next to FIG. 5, a flowchart of a process used for receiving updates from a client is depicted in accordance with a preferred embodiment of the present invention. The process illustrated in FIG. 5 may be implemented in a server, such as data processing system 200 in FIG. 2. These updates typically occur as a result of a synchronization process between the client and the server.

The process begins by receiving a synchronization request along with a list of updates that have been made to the device data at the client since it last performed a synchronization with the server (step 500). These updates are placed in a sandbox, such as sandbox 408 in FIG. 4 (step 502). This sandbox is used to hold the updates until it is determined whether the updates should be applied to the device data cache stored on the server on behalf of the client. The updates are not applied to the device data cache for the client until the union of the updates with the current content of the device data cache can be analyzed for viruses. The updates are then merged with the current content of the device data cache into a temporary location (step 504). This location is, for example, merger area 410 in FIG. 4. The merged content is then scanned or analyzed for viruses (step 506). This virus scanning process may be implemented using various processes well-known to those of ordinary skill in the art. This scan seeks to detect viruses that would arise on the type of client on whose behalf the current synchronization is being performed. The scan may optionally also search for viruses that would arise on other types of pervasive computing devices. The scan may optionally also search for viruses that would arise on the server computer itself.

Next, a determination is made as to whether a virus is present (step 508). If a virus is absent, then the updates in the sandbox are applied to the device data cache (step 510) with the process terminating thereafter.

With reference again to step 508, if a virus is present, an attempt is made to remove the virus (step 512), using techniques that are well-known in the prior art. Thereafter, a determination is made as to whether a virus is still present (step 514). If the virus is no longer present, then the process proceeds to step 510 as described above. Otherwise, the merged content is deleted from the server storage, and an error message is generated (step 516) with the process terminating thereafter. Of course, other actions may be taken instead of generating an error message. For example, the update containing the virus may be deleted automatically or a message may be sent to the client requesting input as to whether to delete the update or to go ahead and merge the update with the client content. In addition, the event may be recorded into a log file, or the system administrator may be notified immediately. Diagnostic information about the virus (including the virus itself) may also be stored for later analysis.

Figure 6:
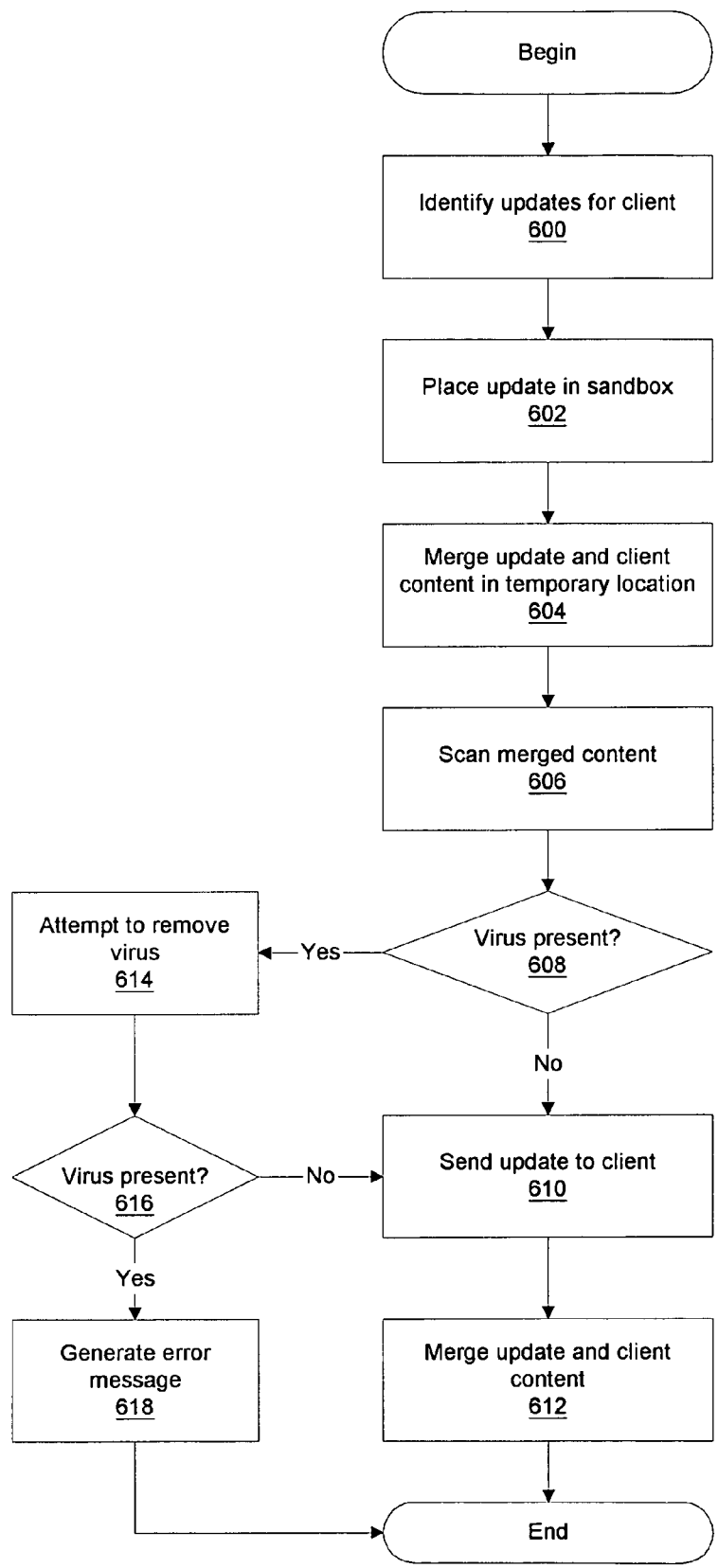
FIG. 6 is a flowchart of a process used for sending updates to a client in accordance with a preferred embodiment of the present invention.

With reference now to FIG. 6, a flowchart of a process used for sending updates to a client is depicted in accordance with a preferred embodiment of the present invention. This process also is implemented in a server, such as data processing system 200 in FIG. 2.

The process begins by identifying one or more updates for a client (step 600). These updates represent the set of changes that server-side applications seek to make to the device data cache stored on the server on behalf of the client, or these updates may be provided directly by the server-side applications. The update for the client is placed in a sandbox (step 602). The update is placed into the sandbox and is neither merged with the device data cache nor delivered to the client. This step helps avoid problems with latent viruses that become active when two or more parts are put together. The update is then merged with the current content of the device data cache in a temporary location (step 604). The merged content is scanned for viruses (step 606). This virus scanning process is well-known to those of ordinary skill in the art. This scan seeks to detect viruses that would arise on the type of client on whose behalf the current synchronization is being performed. The scan may optionally also search for viruses that would arise on other types of pervasive computing devices. The scan may optionally also search for viruses that would arise on the server computer itself.

Next, a determination is made as to whether a virus is present (step 608). If a virus is absent, the update is sent to the client (step 610), and the update is applied to the device data cache stored on the server (step 612) with the process terminating thereafter.

On the other hand, if in step 608, a virus is present, then an attempt is made to remove the virus or disinfect the update (step 614). Another determination is made as to whether the virus is still present (step 616). If the virus is no longer present, the process then proceeds to step 610 as described above. Otherwise, an error message is generated (step 618) with the process terminating thereafter. As before, other actions may be taken instead of generating an error message. For example, the update containing the virus may be deleted automatically or a message may be sent to the client requesting input as to whether to delete the update or to go ahead and merge the update with the client content. In addition, the event may be recorded into a log file, or the system administrator may be notified immediately. Diagnostic information about the virus (including the virus itself) may also be stored for later analysis.

Thus, the present invention provides an improved method and apparatus for protecting clients and servers from exchanging viruses. The mechanism of the present invention reduces the possibility of viruses being exchanged by avoiding combining updates with client content until a union of the content and the updates can be scanned or analyzed for viruses. This mechanism is especially useful for preventing the spread of viruses for devices, which use synchronization processes in communicating with a server. This mechanism also prevents any virus received from being spread to other clients. Any virus received is removed or disinfected at the time of synchronization using the mechanism of the present invention, preventing further spread of the virus.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. For example, although the illustrated implementations are directed towards synchronization of content, the mechanism of the present invention may be applied to other types of updates other than synchronization. In such an alternative embodiment, the server may deliver programs and instructions to the client, for example, as a result of a Web request from a browser executing on the client. In this case, the programs or instructions may be placed into the merger area and scanned for viruses before being delivered to the client. Also, the mechanism of the present invention also may be implemented in locations other than a server. For example, these processes may be implemented in part on a server and in part on a gateway. The device data cache may be located on the server while the sandbox and merger area may be located in the gateway. The actual merging and scanning processes may be implemented in the gateway. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for preventing exchange of viruses with a device wirelessly coupled to the data processing system, the method comprising:
   maintaining preexisting content for the device in a first location in the data processing system, the preexisting content being a duplicate copy of executable code maintained within the device and used by the device for internal operation of the device;
   placing new content associated with the device in a second location, wherein the new content is an update to replace at least some of the preexisting content;
   combining the preexisting content and the new content in a third location to form merged content;
   performing a check for viruses on the merged content prior to performing a transfer of the new content; and
   storing the merged content as the preexisting content that is maintained in the data processing system if a virus is absent from the merged content.

2. The method of claim 1 further comprising:
   sending the merged content to the device if a virus is absent from the merged content.

3. The method of claim 1, wherein the data processing system receives the new content from the device.

4. The method of claim 1, wherein the device is one of a personal digital assistant and a wireless telephone.

5. The method of claim 1, wherein the first location is a hard disk drive in the data processing system.

6. The method of claim 1, wherein the first location is a hard disk drive in a storage system remote to the data processing system.

7. The method of claim 1, wherein the third location is a random access memory in the data processing system.

8. The method of claim 1, wherein the steps of placing, maintaining, and performing are initiated in response to a synchronization process between the data processing system and the device.

9. A data processing system for preventing exchange of viruses with a device wirelessly coupled to the data processing system, comprising:
   a bus system;
   a memory connected to the bus system, wherein the memory includes a set of instructions; and
   a processing unit connected to the bus system, wherein the processing unit executes the set of instructions to maintain preexisting content for a device in a first location in the data processing system, place new content associated with the device in a second location, wherein the new content is an update to replace at least some of the preexisting content, combine the preexisting content and the new content in a third location to form merged content, perform a check for viruses on the merged content, and store the merged content as the preexisting content that is maintained on the data processing system if a virus is absent from the merged content, wherein the preexisting content is a duplicate copy of executable code maintained within the device and used by the device for internal operation of the device.

10. The data processing system of claim 9, wherein the bus system includes a primary bus and a secondary bus.

11. The data processing system of claim 9, wherein the bus system comprises a single bus.

12. The data processing system of claim 9, wherein the processing unit includes a plurality of processors.

13. The data processing system of claim 9, wherein the processing unit includes a single processor.

14. A data processing system for preventing exchange of viruses with a device wirelessly coupled to the data processing system, the data processing system comprising:
   maintaining means for maintaining preexisting content for the device in a first location in the data processing system, the preexisting content being a duplicate copy of executable code maintained within the device and used by the device for internal operation of the device;
   placing means for placing new content associated with the device in a second location, wherein the new content is an update to replace at least some of the preexisting content;
   combining means for combining the preexisting content and the new content in a third location to form merged content;
   performing means for performing a check for viruses on the merged content prior to performing a transfer of the new content; and
   storing means for storing the merged content as the preexisting content that is maintained in the data processing system if a virus is absent from the merged content.

15. The data processing system of claim 14 further comprising:
   sending means for sending the merged content to the device if a virus is absent from the merged content.

16. The data processing system of claim 14 further comprising:
  receiving means for receiving the new content from the device.

17. The data processing system of claim 14, wherein the device is one of a personal digital assistant and a wireless telephone.

18. The data processing system of claim 14, wherein the first location is a hard disk drive in the data processing system.

19. The data processing system of claim 14, wherein the first location is a hard disk drive in a storage system remote to the data processing system.

20. The data processing system of claim 14, wherein the third location is a random access memory in the data processing system.

21. The data processing system of claim 14, wherein the steps of placing, maintaining, and performing are initiated in response to a synchronization process between the data processing system and the device.

22. A computer program product in a computer readable medium for use in a data processing system for preventing exchange of viruses with a device wirelessly coupled to the data processing system, the computer program product comprising:
  first instructions for maintaining preexisting content for the device in a first location in the data processing system, the preexisting content being a duplicate copy of executable code maintained within the device and used by the device for internal operation of the device;
  second instructions for placing new content associated with the device in a second location, wherein the new content is an update to replace at least some of the preexisting content;
  third instructions for combining the preexisting content and the new content in a third location to form merged content;
  fourth instructions for performing a check for viruses on the merged content prior to performing a transfer of the new content; and
  fifth instructions for storing the merged content as the preexisting content that is maintained in the data processing system if a virus is absent from the merged content.

* * * * *